(12) United States Patent
Rios et al.

(10) Patent No.: US 9,224,014 B2
(45) Date of Patent: Dec. 29, 2015

(54) HARD DISK DRIVE SANITIZER SYSTEM AND METHOD

(75) Inventors: Jennifer E. Rios, Houston, TX (US);
Lan Wang, Houston, TX (US); Shab H. Madina, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2953 days.

(21) Appl. No.: 11/528,998

(22) Filed: Sep. 28, 2006

(65) Prior Publication Data
US 2008/0104384 A1    May 1, 2008

(51) Int. Cl.
G06F 21/00    (2013.01)
G06F 21/78    (2013.01)
G06F 21/62    (2013.01)
G06F 21/88    (2013.01)

(52) U.S. Cl.
CPC .............. *G06F 21/78* (2013.01); *G06F 21/62* (2013.01); *G06F 21/88* (2013.01); *G06F 2221/2111* (2013.01); *G06F 2221/2143* (2013.01)

(58) Field of Classification Search
USPC ................ 726/26, 34; 713/187; 711/112, 164
See application file for complete search history.

(56) References Cited

U.S. PATENT DOCUMENTS

| | | | |
|---|---|---|---|
| 6,212,600 B1 * | 4/2001 | Friedman et al. ............ 711/112 |
| 7,509,684 B2 * | 3/2009 | McDonald et al. ............ 726/26 |
| 7,526,620 B1 * | 4/2009 | McGovern ................... 711/159 |
| 7,538,674 B2 * | 5/2009 | Garfinkle .................. 340/572.1 |
| 2004/0268073 A1 * | 12/2004 | Morisawa .................... 711/164 |

* cited by examiner

*Primary Examiner* — Brandon Hoffman
*Assistant Examiner* — Helai Salehi
(74) *Attorney, Agent, or Firm* — Munsch, Hardt, Kopf & Harr

(57) ABSTRACT

A hard disk drive (HDD) sanitizer system comprises an electronic device having a basic input/output system (BIOS), the BIOS comprising a sanitizer routine executable for sanitizing a HDD.

14 Claims, 3 Drawing Sheets

HARD DISK DRIVE SANITIZER SYSTEM AND METHOD

BACKGROUND OF THE INVENTION

Many types of electronic devices contain a hard disk drive for storing data, including sensitive or confidential types of information. The compromise of sensitive or confidential information stored on a hard disk drive remains an important concern, especially when contained in a portable electronic device subject to removal from a secure area, loss or theft or when the electronic device is going to be passed onto another user or recycled.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
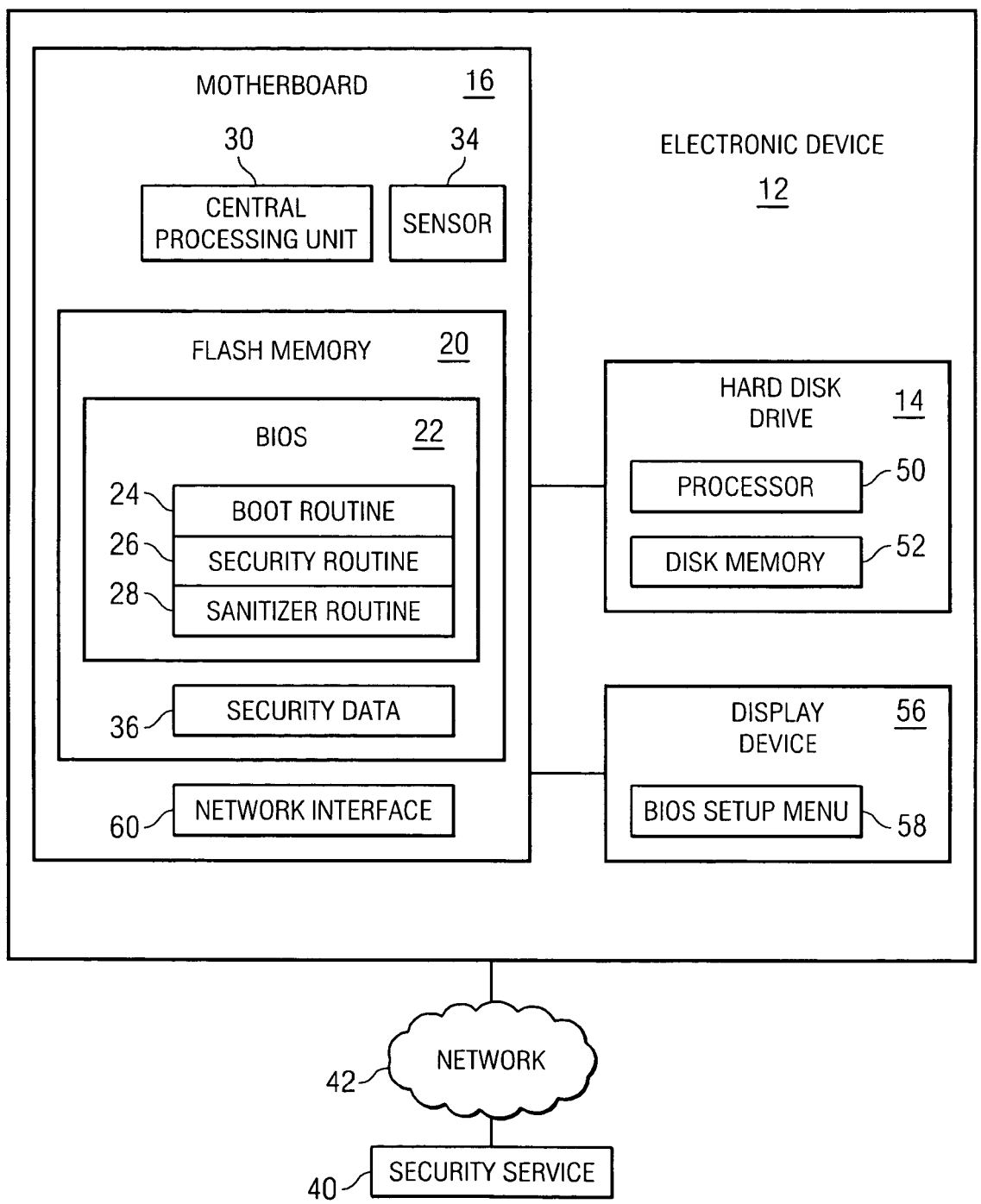
FIG. 1 is a diagram illustrating an embodiment of a hard disk drive sanitizer system in accordance with the present invention.
Figure 2:
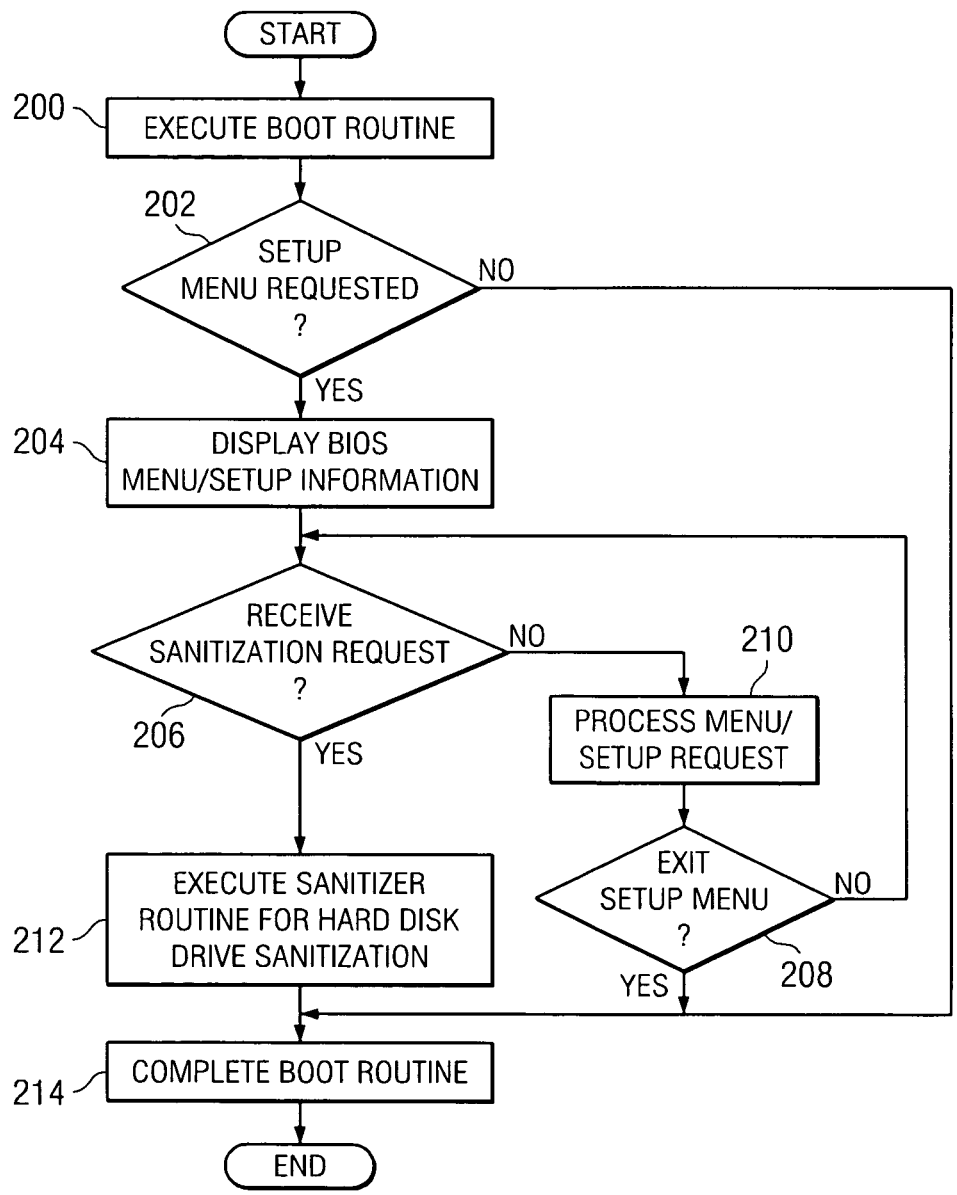
FIG. 2 is a flow diagram illustrating an embodiment of a hard disk drive sanitizer method in accordance with the present invention.
Figure 3:
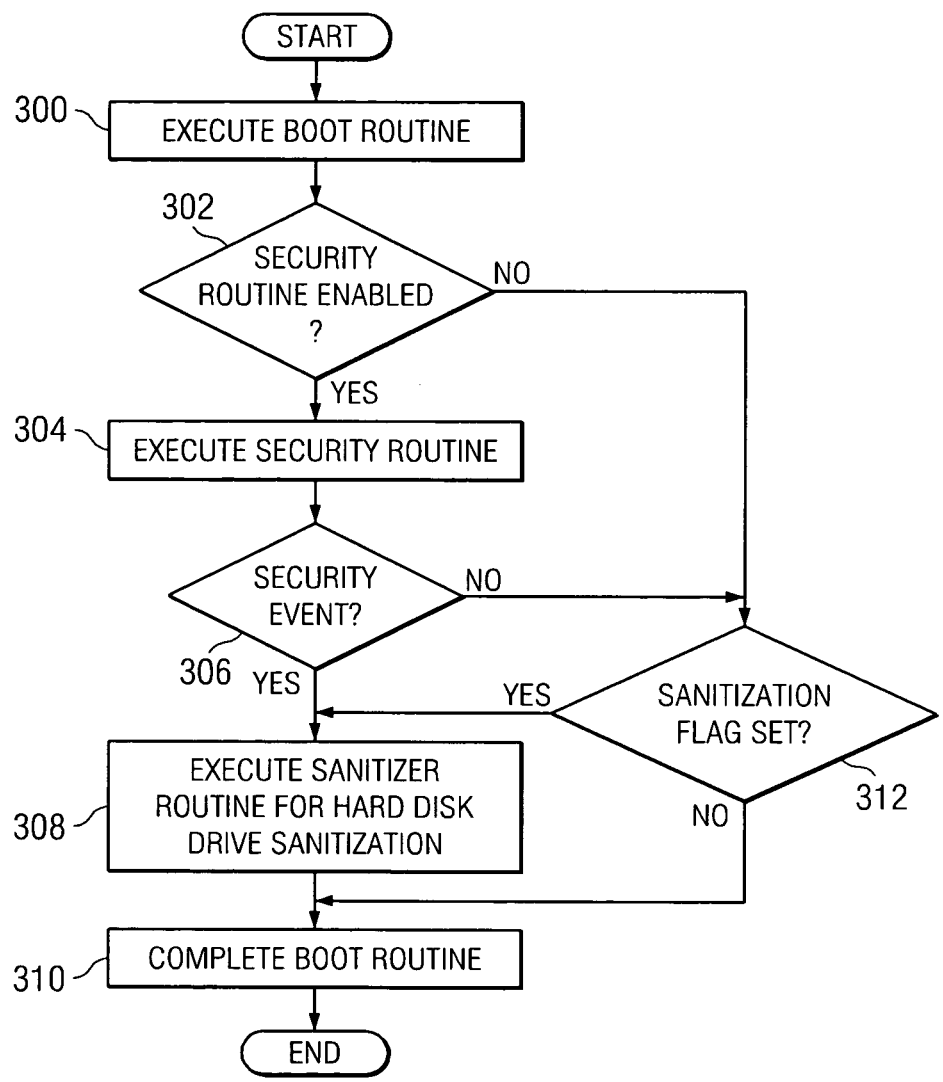
FIG. 3 is a flow diagram illustrating another embodiment of a hard disk drive sanitizer method in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a hard disk drive (HDD) sanitizer system 10 in accordance with the present invention. In the embodiment illustrated in FIG. 1, system 10 is disposed in an electronic device 12 having a HDD 14 communicatively coupled to a motherboard 16. Electronic device 12 may comprise any type of electronic and/or computing device having a HDD disposed therein and/or a HDD configured to be removably coupled to electronic device 12 (e.g., a portable or other type of removable HDD) such as, but not limited to, a desktop computer, portable notebook computer, convertible portable computer, tablet computer, workstation or server.

In the embodiment illustrated in FIG. 1, motherboard 16 comprises a read-only flash memory 20 having a basic input/output system (BIOS) 22 stored therein. BIOS 22 may comprise hardware, software, firmware, or a combination thereof. In the embodiment illustrated in FIG. 1, BIOS 22 comprises a boot routine 24, a security routine 26 and a sanitizer routine 28. Boot routine 24, security routine 26 and sanitizer routine 28 comprise a set of instructions executable by a central processing unit (CPU) 30 of motherboard 16. For example, boot routine 24 comprises a set of instructions executable by CPU 30 for controlling booting operations upon startup or power-on of electronic device 12 such as a power-on self-test (POST) routine. It should be understood that boot routine 24 may also comprise instructions for saving and/or restoring state information of electronic device 12 or other functions in connection with a wake event associated with a hibernation, sleep or other type of reduced power and/or processing state of electronic device 12.

Security routine 26 comprises a set of instructions for controlling and/or otherwise evaluating a security condition associated with electronic device 12. For example, in some embodiments of the present invention, system 10 comprises a sensor 34, such as a geopositional sensor, for determining and/or otherwise providing information associated with a physical or geopositional location of electronic device 12. Thus, for example, security routine 26 uses information received from and/or otherwise detected by sensor 34 corresponding to a present location of electronic device 12 to determine whether a security event exists for electronic device 12 (e.g., whether electronic device 12 having HDD 14 therein has been removed from a secure area). In FIG. 1, memory 20 comprises security data 36 stored therein comprising information associated with various security parameters of electronic device such as, but not limited to, information associated with permissible geographical locations where electronic device 12 may be transported and/or restrictions on a location of electronic device 12. Thus, in operation, information received and/or otherwise obtained from sensor 34 is compared with security data 36 to determine whether a security event exists for electronic device. In FIG. 1, security data 36 is illustrated as being stored in memory 20. However, it should be understood that security data 36 may be otherwise stored (e.g., in a memory component capable of being re-written such as non-volatile random access memory (NVRAM), erasable programmable read-only memory (EPROM), etc.).

In some embodiments of the present invention, security routine 26 comprises a set of instruction for detecting and/or otherwise evaluating an indication or notice of a security event received from a remote service. For example, in some embodiments of the present invention, electronic device 12 is communicatively couplable to a remote security service 40 via a communication network 42. Communication network 42 may comprise the Internet, an intranet, a local area network, wide area network, or a combination thereof and may be a wired or wireless network. In some embodiments of the present invention, security service 40 comprises a service for reporting and/or otherwise indicating a loss or theft of electronic device 12. In operation, for example, during booting of electronic device 12, BIOS 22 automatically connects and/or otherwise communicates with security service 40 to determine whether a security event exists for electronic device 12 (e.g., an indication that electronic device 12 has been reported stolen or lost).

Sanitizer routine 28 comprises a set of instructions for sanitizing HDD 14. For example, in some embodiments of the present invention, sanitizer routine 28 comprises a set of instructions for implementing a version of the sanitizer algorithm defined by DOD 5220.22-M standard specification (publicly available). However, it should be understood that other types of algorithms and/or methods may be used to sanitize HDD 14. Thus, for example, sanitizer routine 28 preferably comprises a set of instructions for overriding information contained on HDD 14 to facilitate purging, wiping, cleaning and/or otherwise destroying data contained on HDD 14.

In the embodiment illustrated in FIG. 1, HDD 14 comprises a processor 50 and disk memory 52. As discussed above, sanitizer routine 28 is used to sanitize disk memory 52 to overwrite and/or otherwise make unavailable or undetectable information stored on disk memory 52. In FIG. 1, electronic device 12 comprises a display device 56 such as, but not limited to, a liquid crystal display (LCD) for visually displaying information to a user of electronic device 12. In FIG. 1, display device 56 is illustrated as forming part of electronic device 12. However, it should be understood that display device 56 may comprise an external or peripheral component removably couplable to electronic device 12.

In operation, sanitizer routine 28 is disposed and/or otherwise forms part of BIOS 22 and is executable to sanitize disk memory 52 of HDD 14. In some embodiments of the present invention, during booting of electronic device 12 (e.g., in response to a power-on event or wake event), a user or administrator associated with electronic device 12 may access a BIOS set up menu 58 (illustrated as being displayed by display device 56 and FIG. 1) by pressing a function key of a keyboard input device or other type of command. Preferably, BIOS setup menu 58 provides an interface for displaying to a user or administrator associated with electronic device 12 a listing of selectable options for BIOS 22 including a selectable option for invoking sanitizer routine 28. Thus, in response to receiving a user input to invoke sanitizer routine 28, sanitizer routine 28 is executed to sanitize disk memory 52 of HDD 14.

In some embodiments of the present invention, BIOS 22 is configured to automatically execute and/or invoke sanitizer routine 28. For example, in some embodiments of the present invention, during a user session of electronic device 12 (e.g., use of electronic device 12 via an operating system or other type of platform), a user may request HDD 14 sanitization during a subsequent boot of electronic device 12. In this example, during a user session of electronic device, a call from an operating system or other platform is made to BIOS 22 and causes a flag or other type of indicator to be set in BIOS 22 for automatically invoking sanitizer routine 28 during a subsequent boot of electronic device 12. Thus, in operation, during a subsequent boot process of electronic device 12, BIOS 22, in response to detecting that a flag has been set indicating HDD 14 sanitization, BIOS 22 automatically invokes sanitizer routine 28 to sanitize disk memory 52 of HDD 14.

In some embodiments of the present invention, BIOS 22 is configured to automatically invoke sanitizer routine 28 in response to a security event. For example, in some embodiments of the present invention, information and/or signals obtained from sensor 34 are used to determine a location of electronic device 12. As discussed above, sensor 34 may comprise a geopositional sensor for indicating a geographical position of electronic device 12. Thus, in operation, security routine 26 uses information obtained and/or detected by sensor 34 indicating a geographical location of electronic device 12 and compares the detected information with security data 36 to determine whether a security event exists (e.g., a security event may exist if electronic device 12 has been removed from a secure area and/or has been otherwise transported to an area or location which may be considered a risk for compromising information contained on disk memory 52). Thus, if security routine 26 determines that a security event exists based on information received and/or otherwise detected by sensor 34, sanitizer routine 28 is automatically invoked to sanitize disk memory 52 of HDD 14.

In some embodiments of the present invention, sanitizer routine 28 is automatically executed and/or invoked in response to receiving a notice of a security event from a remote security service 40. Security service 40 may comprise a third party security or monitoring service for reporting loss or theft of electronic device 12. Thus, for example, if electronic device 12 is lost or stolen, a user, owner or administrator associated with electronic device 12 may report the event to security service 40. For example, in this embodiment of the present invention, BIOS 22 is configured to automatically connect to and/or otherwise communicate with security service 40 via network 42 via a network interface 60 of motherboard 16 during booting of electronic device 12 (e.g., in response to a power-on event or wake event). If information associated with a security event is received by BIOS 22 from security service 40 (e.g., a notice indicating that electronic device 12 has been reported lost or stolen), sanitizer routine 28 is automatically invoked to sanitize disk memory 52 of HDD 14.

FIG. 2 is a flow diagram illustrating an embodiment of a HDD sanitizer method in accordance with the present invention. In FIG. 2, the method begins at block 200, where BIOS 22 executes boot routine 24. Boot routine 24 may be executed by BIOS 22 in response to a power-on event or wake event from a hibernation, sleep or other type of reduced-power operating mode of electronic device 12. At decisional block 202, a determination is made whether access to BIOS set up menu 58 is desired (e.g., in response to receiving a function key input or other type of request input). If at decisional block 202 access to BIOS set up menu 58 is not requested, the method proceeds to block 214. If access to BIOS set up menu 58 is desired, the method proceeds from decisional block 202 to block 204, where BIOS set up menu 58 is displayed on display device 56. At decisional block 206, a determination is made whether a request for sanitization of disk memory 52 of HDD 14 is received. For example, from BIOS set up menu 58, a user may select and/or otherwise provide input indicating a request to have HDD 14 sanitized. If HDD 14 sanitization is not requested, the method proceeds to block 210, where any action(s) requested by the user in the BIOS setup are processed. At decisional block 208, a determination is made whether a request to exit BIOS set up menu 58 is received. If exit from BIOS set up menu 58 is not yet requested, the method proceeds to decisional block 206 where continued monitoring to determine whether a sanitization request is received. If exit from BIOS set up menu 58 is desired, the method proceeds from decisional block 208 to block 214 where any remaining functions and/or routines of boot routine 24 are completed. If at decisional block 206 it is determined that a request for HDD 14 sanitization is received, the method proceeds to block 212, where sanitizer routine 28 is invoked and/or otherwise executed to sanitize HDD 14. The method proceeds to block 214, where BIOS 22 completes any remaining functions, processes and/or routines of boot routine 24.

FIG. 3 is a flow diagram illustrating another embodiment of a HDD sanitizer method in accordance with the present invention. In FIG. 3 the method begins at block 300, where BIOS 22 executes boot routine 24. At decisional block 302, a determination is made whether security routine 26 is enabled within BIOS 22. If security routine 26 is enabled BIOS 22, the method proceeds to block 304, where security routine 26 is invoked and/or otherwise executed.

At decisional block 306, a determination is made whether a security event exists for electronic device 12 using security routine 26. If a security event exists for electronic device 12, the method proceeds to block 308, where sanitizer routine 28 is invoked and/or otherwise executed for sanitizing disk memory 52 of HDD 14. The method proceeds to block 310, where any remaining functions or routines of boot routine 24 are completed.

At decisional block 302, if security routine 26 is not enabled in BIOS 22, the method proceeds to decisional block 312, where a determination is made whether a sanitization flag has been set. For example, during a user session of electronic device 12, a user may request that HDD 14 sanitization take place during a subsequent boot of electronic device 12. If it is determined at decisional block 312 that a sanitization flag has been set, the method proceeds to block 308, where sanitizer routine 28 is automatically invoked and/or otherwise executed to sanitize disk memory 52 of HDD 14. If it is determined that a sanitization flag has not been set at decisional block 312, the method proceeds to block 310, where any remaining functions of boot routine 24 are executed. At decisional block 306, if security routine 26 determines that no security event exists, the method proceeds to decisional block 312.

Thus, embodiments of the present invention provide a HDD sanitizer routine 28 in BIOS 22 that executable at a user's request and/or automatically executable in response to a security event or other type of action.

What is claimed is:

1. A hard disk drive (HDD) sanitizer system, comprising:
an electronic device having a basic input/output system (BIOS), the BIOS comprising a sanitizer routine executable for sanitizing a HDD wherein the BIOS invokes the sanitizer routine in response to a detected security event;
wherein, during booting of the electronic device, the BIOS is to display a BIOS setup menu for receiving an input for invoking the sanitizer routine.

2. The system of claim 1, wherein the BIOS is configurable to automatically invoke the sanitizer routine.

3. The system of claim 1, wherein the BIOS is configurable to receive a request to invoke the sanitizer routine.

4. The system of claim 1, wherein the BIOS comprises a security routine configured to invoke the sanitizer routine in response to a security event.

5. The system of claim 1, wherein the BIOS is configurable to invoke the sanitizer routine in response to receiving an indication of a security event from a remote service.

6. The system of claim 1, wherein the BIOS is configurable to invoke the sanitizer routine in response to a signal received from a sensor indicating a geo-positional location of the electronic device.

7. A hard disk drive (HDD) sanitizer method, comprising:
initiating a boot routine;
during the boot routine, displaying a BIOS setup menu for receiving input from a user for invoking a sanitizer routine;
in response to the input, invoking a sanitizer routine disposed within a basic input/output system (BIOS) of an electronic device for sanitizing a HDD in response to a detected security event, wherein the sanitizer routine is invoked by the BIOS.

8. The method of claim 7, further comprising invoking the sanitizer routine in response to receiving an input requesting execution of the sanitizer routine.

9. The method of claim 7, further comprising automatically invoking the sanitizer routine in response to booting of the electronic device.

10. The method of claim 7, further comprising automatically invoking the sanitizer routine in response to receiving an indication of a security event from a remote service.

11. The method of claim 7, further comprising automatically invoking the sanitizer routine in response to a signal received from a sensor indicating a geo-positional location of the electronic device.

12. A hard disk drive (HDD) sanitizer system, comprising:
means disposed within a basic input/output system (BIOS) of an electronic device for sanitizing a HDD; and
means disposed within the BIOS for displaying a menu means for receiving input from a user for invoking the sanitizing means in response to a detected security event.

13. The system of claim 12, further comprising means for automatically invoking the sanitizing means.

14. The system of claim 12, further comprising means for automatically invoking the sanitizing means in response to a signal received from a sensor means indicating a geo-positional location of the electronic device.

* * * * *